United States Patent [19]
Jones

[11] 3,850,807
[45] Nov. 26, 1974

[54] SYSTEM FOR REMOVING FLOATING OIL FROM WATER

[75] Inventor: Loyd W. Jones, Tulsa, Okla.

[73] Assignee: Amoco Production Company, Tulsa, Okla.

[22] Filed: Oct. 15, 1971

[21] Appl. No.: 189,663

[52] U.S. Cl............ 210/170, 210/242, 210/DIG. 21
[51] Int. Cl............................................. E02b 15/04
[58] Field of Search .............................. 55/171–177; 252/328–330, 439; 210/23, 30, 36, 39–41, 65, 73, 83, 84, 170, 242, 265, 285, 286, 291–293, 320, 484, 502, DIG. 5, DIG. 21

[56] References Cited
UNITED STATES PATENTS

| 1,812,629 | 6/1931 | Gifford ............................. 252/330 |
| 2,102,796 | 12/1937 | Happel et al. .................. 252/439 X |
| 2,385,527 | 9/1945 | Menefee et al. .................. 210/28 X |
| 3,563,380 | 2/1971 | Thomas ........................... 210/170 X |
| 3,567,660 | 3/1971 | Winkler ........................... 210/40 X |
| 3,779,382 | 12/1973 | Steltner .............................. 210/83 |

FOREIGN PATENTS OR APPLICATIONS

| 3,036 | 2/1900 | Great Britain ....................... 210/40 |

Primary Examiner—Thomas G. Wyse
Attorney, Agent, or Firm—John D. Gassett; Paul F. Hawley

[57] ABSTRACT

This invention relates to water pollution control and especially concerns a system for removing dispersed oil from a flowing inland stream. A bed of granular sulfur is provided within a unique container buoyantly supported by the stream. In most oily streams the oil, due to gravity, accumulates on the surface in a very thin film, sometimes referred to as an oil slick or sheen. This top portion of the stream is directed through the bed of granular sulfur where the oil is coalesced and removed, leaving clean water flowing from the container.

6 Claims, 4 Drawing Figures

SYSTEM FOR REMOVING FLOATING OIL FROM WATER

CROSS REFERENCES TO RELATED APPLICATION

This application is related to U.S. Pat. application Ser. No. 80,424, entitled "Removing Oil From Waste Water With Sulfur," filed Oct. 13, 1970. The sole inventor in that application is Loyd W. Jones who is also inventor of the present application.

BACKGROUND OF THE INVENTION

1. Field of the Invention

This invention relates to a method and apparatus for removing oil from a flowing inland stream. It particularly relates to a system for removing sheen composed of minute oil particles from the surface of a flowing stream.

2. Setting of the Invention

In recent years the government and public have become increasingly aware of the need to eliminate pollution of our atmosphere and of our water. Industry is moving to eliminate these pollution problems both due to a sense of public obligation and to meet legal requirements. Also many of our larger industrial areas are experiencing air pollution problems. It is believed, however, that as a nation elimination of pollution from our water system is more urgent.

Many water pollution problems are recognized but a practical solution is not always readily apparent. One real problem of concern is the problem of maintaining our natural inland streams free of oil. Unfortunately, when large volumes of oil are produced and transported to the public market, leaks or accidental spills do occur despite great precaution by the operators. All too often some of the oil spilled or lost finds its way to inland streams. Ordinarily the oil in the stream is carried along the surface of the water. To prevent damage to wildlife and vegetation, the oil, if of a significant amount, must be removed. In many cases the amount of oil present is not harmful to wildlife but should be removed for appearances sake.

There have been various systems offered to the public for removing oil from flowing streams. In some typical systems, corraling booms are positioned across the stream to confine the oil. Floating skimmer heads connected to suction hoses are then used to suck up the oil. When the oil slick is very thin the floating skimmers draw in more water than oil and do not remove the oil sheen completely. One system for use in very still calm waters, includes laying adsorbent materials contained in open knit bags across the stream to soak up oil. However, these have limited oil holding capacity and oil can escape over and under them in rapidly moving streams. These systems are not widely used at present.

BRIEF SUMMARY OF THE INVENTION

This invention includes a combination oil accumulator-separator floated on the stream containing the oil slick or sheen. It is preferably tied in the middle of the stream to both banks by floating vertical barriers. The stream current carries the floating oil plus some water off the top of the stream guided by the vertical barriers into the throat of the oil accumulator-separator. The separator contains a bed of granular sulfur supported by a perforated plate. The supporting plate has nonperforated corrugations or protected channels. The oily water flows through the sulfur bed where the oil is coalesced and concentrated. As the water and coalesced oil flows out the lower perforations, the oil seeks the protection of the channels. The channels are tilted upwardly in a downstream direction toward a collecting conduit which is connected to a pump. The coalesced oil is removed by the pump and the oil-free water flows downward and out the perforations of the plate and again becomes a part of the main flow of the stream.

BRIEF DESCRIPTION OF THE DRAWINGS

A better understanding of the invention, various modifications and objects thereof can be made with the following description taken in conjunction with the drawings.

Figure 1:
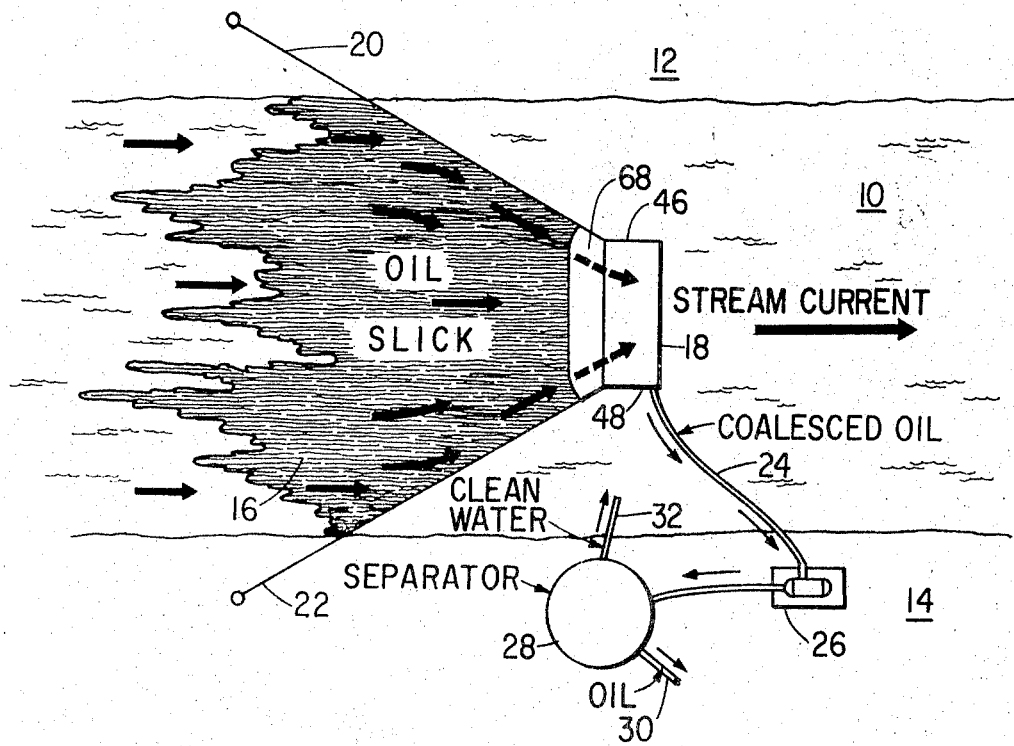
FIG. 1 is a plan view of my oil removing unit placed in a stream of water.

Attention is first directed to FIG. 1. Shown thereon is a flowing stream of water 10 having banks 12 and 14. The stream has an oil slick 16 floating thereon. This oil slick 16 can vary in thickness from an extremely thin film of only a few molecules thick where only traces of oil are found to a thickness of 1 to 2 inches or more where there has been a major oil spill on the stream. My system is particularly useful for removing the minute layers of oil which cause an oil sheen and which is really the most difficult to remove. The total quantity of oil may be large but is spread on the water as a very thin film. As mentioned above if there is a thick layer of oil, the bulk of the oil can be removed by mechanical skimming devices. By proper sizing of my device I can remove any quantities of oil from the stream.

An accumulator oil separator 18 is located in midstream and is supported by flotation means. The oil accumulator separator 18 is tied to banks 12 and 14 by floating vertical guide barriers 20 and 22 respectively. The oil which has been separated from the water is flowed through flow line 24 which is connected to pump 26 located on the bank. There is a small amount of water collected with the oil. However, as will be discussed later, the oil is now coalesced into large droplets, the oil and water can be separated by any simple separator tank. Thus the outlet of pump 26 is connected to oil water separator 28. The oil is removed through outlet 30 and the clean water is removed through outlet 32 to return to the stream.

Figure 2:
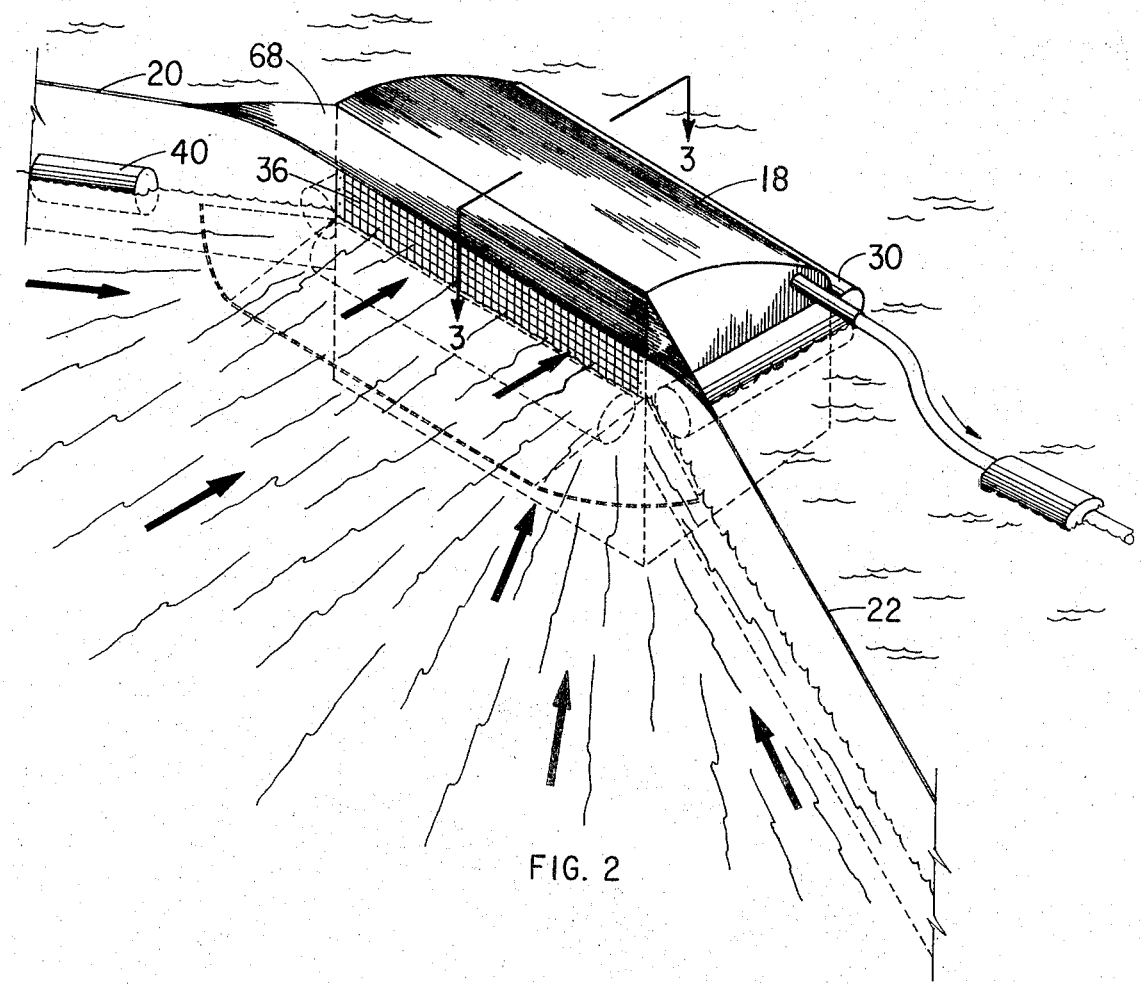
FIG. 2 is an isometric view of the oil removing unit.

FIG. 2 is an isometric view of the oil accumulator-separator of FIG. 1. Shown thereon is container 18. Vertical barriers 20 and 22 directs the oily water to throat 36. The container 18 is supported by flotation members 30 and vertical barrier 20 is supported by flotation means 40.

Figure 3:
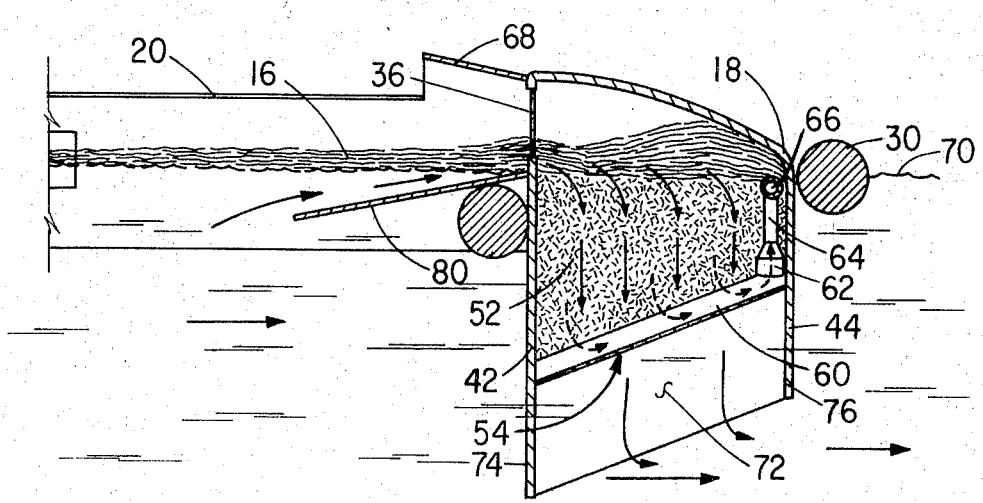
FIG. 3 is a cross section view taken along the line 3—3 of FIG. 2.

Attention is now directed to FIG. 3 which is a cross section of the oil accumulator-separator and can be used to best describe the actual oil separation. Container 18 is seen to have a vertical front wall 42 and a rear vertical wall 44. It also has side walls 46 and 48 as indicated in FIG. 1. Container 18 has a throat 36 which faces upstream and is supported at the level of the water surface at an elevation to receive all the layer of oily water supported on the surface of the stream. A flow diverting plate 80 extends downwardly in an upstream direction from throat 36. Inside the container 18 just below the level of the throat 36 is a coalescing bed 52 of granular sulfur, prilled sulfur or sulfur coated onto sand, plastic beads or other supporting material. As I taught in my said U.S. Pat. application Ser. No. 80,424 I have discovered that the surface of elemental sulfur is highly efficient as an oil collector. The surface of yellow sulfur is many times, at least three, more efficient in this respect than other forms of sulfur such as white sulfur for example. Yellow sulfur is also many times, at least three, more efficient than other substances such as carbon and straw. The oil-sulfur contact angle of yellow sulfur is apparently very low for most unrefined petroleum oils and the adhesive force strong. Visual observations indicate that an oil film on sulfur can increase to a surprising thickness in the presence of flowing oily water such as water containing as little as 1 to 10 ppm. In contact with sulfur the oil film appears to be abnormally cohesive.

Figure 4:
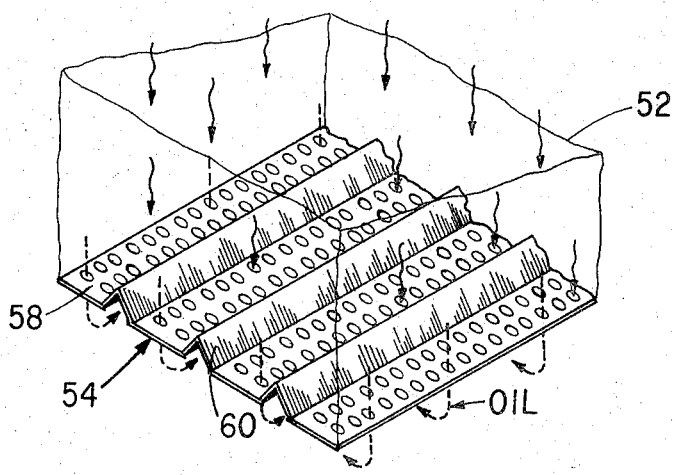
FIG. 4 is an isometric view of the perforated plate and channels in the lower side of the oil accumulator separator for supporting the sulfur bed.

The sulfur bed is supported by plate means 54. The nature of this plate means can best be seen in FIG. 4. The outline of the sulfur bed is indicated by fine outline 52. The plate has alternating perforated sections 58 and unperforated corrugated sections 60. The sulfur medium particles should generally be in the size range of 1 to 4 milliliters diameter and the perforations in the supporting plate should be small enough to retain the particles. The corrugated section 60 forms protected channels for the accumulation of oil which is indicated by dashed arrows. As can be seen in FIG. 3 plate 54 is sloped upwardly toward the downstream side of the oil accumulator-separator 18 or back plate 44. Each channel 60 has a collecting bell 62 which is connected to a vertical conduit 64. Each conduit 64 is connected to an oil gathering conduit 66 which is connected through line 24 to pump 26 as shown in FIG. 1.

Throat means 36 is provided with a splash plate 68 which prevents the oily film splashing over the top of container 34. This splash plate 68 is connected to the guides 20 and 22 at the ends. The vertical dimension of throat 36 and vertical elevation of guides 20 and splash plate 68 will of course depend upon the waves of the flowing stream 10. However, it is contemplated that in the most widely used application of this invention, that the water will be relatively calm. In such event it is anticipated that typical vertical dimension of throat opening 36 will be in the range of from about 2 inches to 1–2 feet and vertical guide 20 will normally typically by extending from 6 inches to 1 foot below to 6 inches to 2 feet above the mean water level 70. Splash plate 68 will normally typically extend 6 inches to 1–2 feet above the top of guide 20. It is to be emphasized that these dimensions are merely illustrative and will vary according to stream conditions.

The vertical thickness of sulfur bed 52 is typically in the range of from about 6 inches to 3 feet to give adequate contact time between the oily water flowing therethrough for the sulfur to coalesce the oil droplets so that they can be removed.

A quiet zone 72 is provided immediately below plate 54. This is accomplished by providing forward skirts 74 and 76 which are in reality mere extension of forward and rearward plates 42 and 44. The lower end of skirt 76 is at a higher elevation than the lower end of skirt 74. Side plates 46 and 48 extend downwardly to form a open end position.

If the current in stream 10 is quite rapid it may be desirable to use one or two additional plates (of the kind shown in FIG. 4) placed in quiet zone 72. These additional plates would be about 1 inch apart and essentially parallel to and below plate 54. Any oil that might possibly tend to be swept by the first plate 54 would be caught in the protected channels of one of the lower plates.

Various modifications can be made to the above described embodiment without departing from the spirit or scope of the invention. For example, essentially the apparatus described above could be towed over a large body of water to scoop in and separate spilled oil. In such case, vertical barrier 20 and 22 would be towed by boat and oil pump 26 and separator 28 would be mounted on a boat. Additionally two or more of the apparatus can be connected laterally by connecting skirted booms to provide greater oil removing capacity on very wide streams.

I claim:

1. An apparatus for removing floating oil from a flowing inland stream of oily water which comprises:
a coalescing bed of elemental sulfur supported in said stream;
means to divert at least the upper portion of said stream through said coalescing bed to cause the oil to coalesce;
means to remove said coalesced oil.

2. An apparatus as defined in claim 1 including a plate means for supporting said sulfur coalescing bed, said plate means being supported in an upwardly sloping direction with respect to the flow of said stream, said plate means including alternating perforated areas and protected unperforated areas forming oil collecting channels running longitudinally with said stream.

3. An apparatus as defined in claim 2 in which the means to remove said coalesced oil includes a pump with its intake connected to said channels.

4. An apparatus as defined in claim 2 including vertical upstream, downstream and side walls extending downwardly from the periphery of said plate means and being open at the lower end to form a quite zone.

5. An apparatus as defined in claim 4 in which the lower end of said downstream vertical wall terminates at a higher elevation than the upstream vertical wall.

6. An apparatus as defined in claim 4 including a container for supporting said sulfur bed having a throat and also including means for diverting the upper portion of the stream into said throat which includes skirt means extending from each side of said throat to the side of said stream and including means to support said skirt at the surface of said stream.

* * * * *